Dec. 28, 1965 W. C. HAID 3,226,153
TWO-POSITION REMOVABLE ROOF BOW
Filed Sept. 24, 1964 2 Sheets-Sheet 1
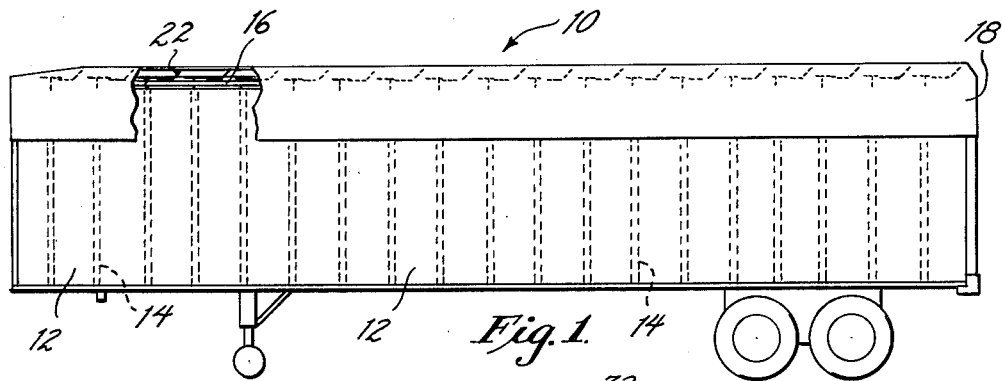
Fig. 1.
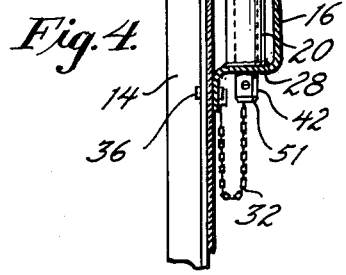
Fig. 4.
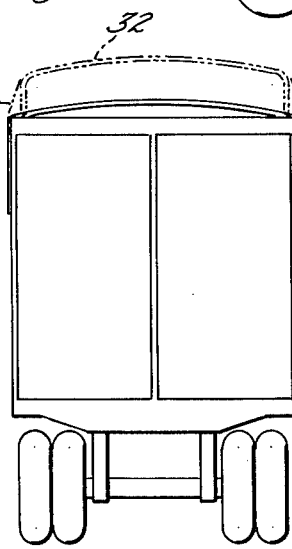
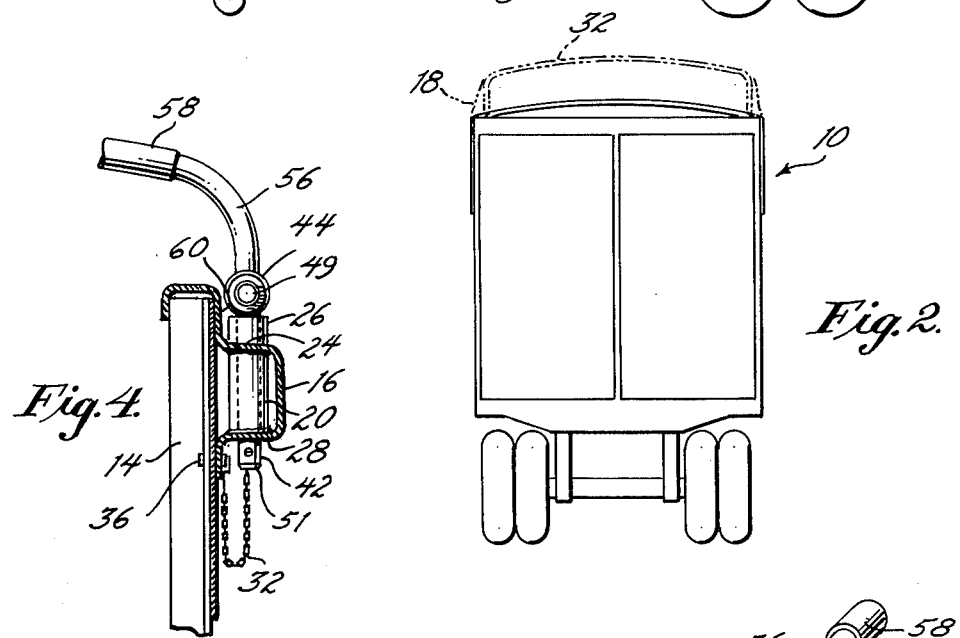
Fig. 2.
Fig. 3.
INVENTOR.
WILLIAM C. HAID
BY
Millman and Jacobs
ATTORNEYS.

Dec. 28, 1965 W. C. HAID 3,226,153
TWO-POSITION REMOVABLE ROOF BOW
Filed Sept. 24, 1964 2 Sheets-Sheet 2
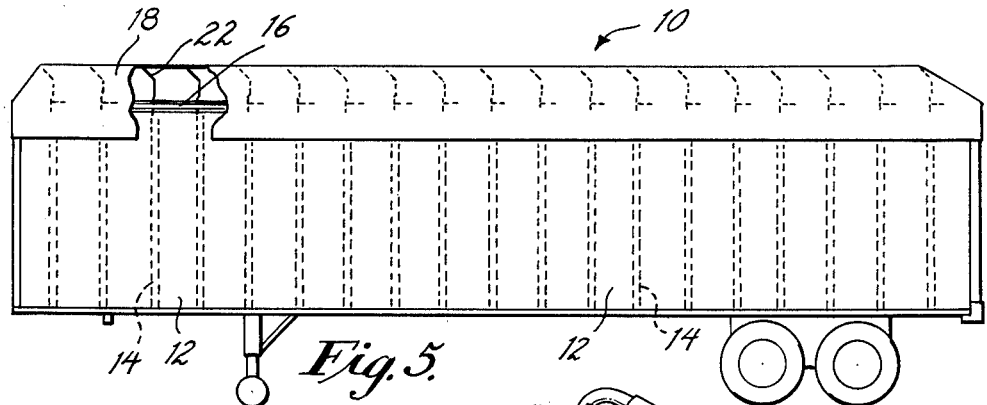
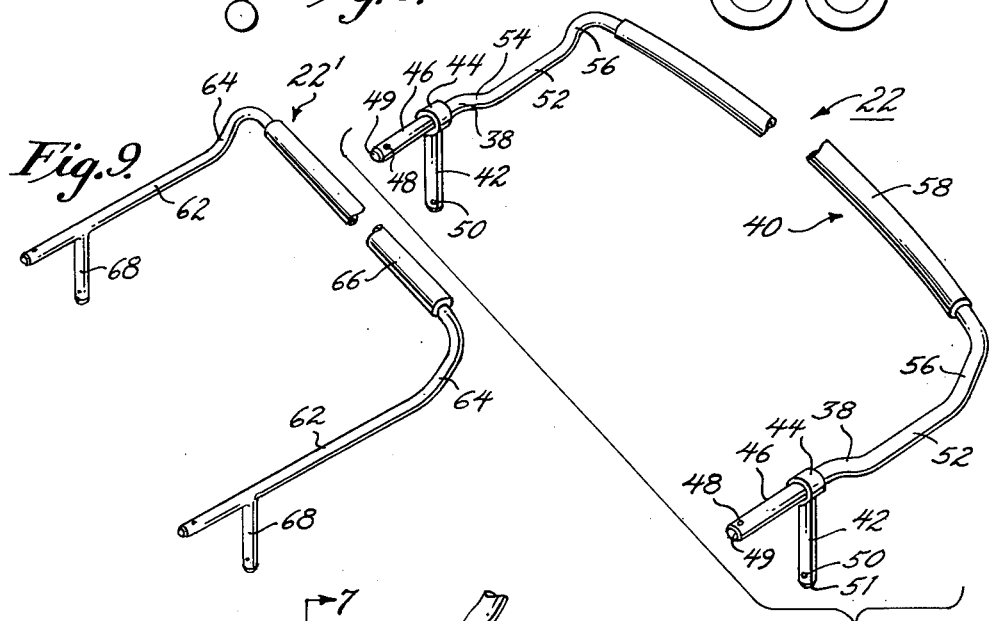
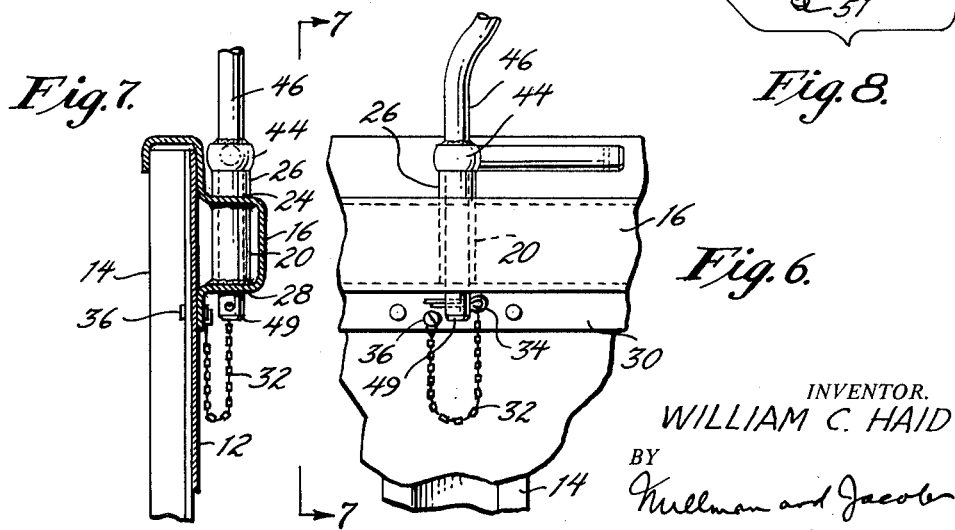
INVENTOR.
WILLIAM C. HAID
BY
ATTORNEYS.

United States Patent Office 3,226,153
Patented Dec. 28, 1965

3,226,153
TWO-POSITION REMOVABLE ROOF BOW
William C. Haid, Philadelphia, Pa., assignor to Strick Trailers, a Division of Fruehauf Corporation, Fairless Hills, Pa., a corporation of Michigan
Filed Sept. 24, 1964, Ser. No. 398,990
9 Claims. (Cl. 296—104)

This invention relates to removable roof bows for open-top trailer bodies which are adapted to perform the dual function of structurally holding the side walls together and of supporting a tarpaulin cover.

Conventionally, the roof bows extend upwardly from the side walls at a predetermined fixed height which, in combination with the sides of the trailer body, provides a fixed cargo space therein. It is the primary object of this invention to provide a roof bow for a trailer body which is readily adjustable between two positions to thereby permit the operator to attain two different cargo capacities in the same vehicle.

Another object of the invention is to provide a removable roof bow which may be selectively secured to the top of a trailer in a low or a high position and which is additionally structurally sound in both positions.

Another object of the invention is to provide a generally U-shaped roof bow comprising a pair of legs in a common plane, a web extending at an angle from said common plane and a pair of auxiliary legs attached perpendicular to said legs and extending to the side of the plane opposite that to which the web extends in order to be selectively mounted in a high or a low position.

These and other objects of the invention will become more apparent as the following description proceeds in conjunction with the accompanying drawings, wherein:

FIG. 1 is a side elevational view of a trailer body utilizing the instant roof bow in a low position;

FIG. 2 is a rear view of the trailer body shown in FIG. 1, the high position of the roof bow being shown in phantom;

FIG. 3 is an enlarged fragmentary side elevational view showing the instant roof bow mounted in a low position;

FIG. 4 is a sectional view taken on the line 4—4 of FIG. 3;

FIG. 5 is a side elevational view of the trailer body showing the instant roof bow mounted in a high position;

FIG. 6 is an enlarged fragmentary side elevational view showing the instant roof bow mounted in a high position;

FIG. 7 is a sectional view taken on the line 7—7 of FIG. 6;

FIG. 8 is a broken away perspective view of one form of roof bow per se; and

FIG. 9 is a broken away perspective view of a modified form of roof bow per se.

Specific reference is now made to the drawings wherein similar reference characters are used for corresponding elements throughout.

Indicated generally at 10 is an open top trailer body having side panels 12 which are appropriately secured upon and between spaced vertical posts 14. Longitudinal top rails 16 are secured to the upper ends of the side panels and posts 14. Sockets 20 are provided along the top rails for removably holding roof bows 22. The roof bows, in turn, serve to support a tarpaulin cover 18.

The top rail 16 projects from the wall of the trailer, thereby providing a top ledge 24 and a bottom ledge 28. Sockets 20 are welded in the top rail 16 at the top and bottom ledge. A portion 26 projects above the top ledge 24 of the top rail, and the remaining portion of the socket 20 extends through the upper ledge of the top rail to the bottom ledge 28. On the bottom flange 30 of the top rail 16 below and adjacent each of the sockets 20, a chain 32 with a cotter pin 34 fastened at one end is secured to the flange 30 by a suitable fastener 36. The cotter pin 34 is used to secure the ends of the roof bow 22 in the socket 20.

The roof bow 22 (shown in FIG. 8) is generally U-shaped and includes a pair of parallel legs 38, a web 40 and a pair of auxiliary legs 42 that are attached by collars 44 to the legs 38. Collars 44 may be secured by welding or other suitable means.

The end pieces 46 of each leg 38 are adapted to be inserted in the sockets 20. These end pieces 46 are in a common plane, each including a hole 48 that receives the cotter pin 34 to secure the end piece 46 in socket 20 when mounted therein. So mounted, the web is in a high position with respect to the trailer, and the collar 44 acts as a bearing surface against the top surface of the upper portion 26 of socket 20.

Each of the auxiliary legs 42 includes a hole 50 and is adapted to be inserted in the socket 20. These auxiliary legs 42 are parallel to each other and are each perpendicular to the common plane of the end pieces 46. When the auxiliary legs 50 are inserted in socket 20, the web 40 of the roof bow 22 is in a low position with respect to the trailer. The collars 44 rest on the top surface of the sockets 20, and cotter pins 34 are inserted in holes 50 in order to secure the auxiliary legs in the respective sockets.

The end pieces 46 of the legs 38 and auxiliary legs 42 are beveled at their ends 49 and 51, respectively. The resulting chamfers facilitate insertion of the legs in the sockets 20 and serve to smooth the sharp ends thereof.

Each of the legs 38 further includes another straight portion 52 which is connected to end piece 46 via curved piece 54. The straight portions 52 of each leg are in a common plane which is parallel and spaced from the common plane of the end pieces 46. As seen in FIG. 3, this straight portion 52 is indented from the plane of end pieces 46 by an amount equal to the elevation of the end piece 46 from the ledge 24 of top rail 16 when the auxiliary leg 42 is in socket 20 and the roof bow 22 is thus mounted with the web 40 in a low position. In this manner, the straight piece 52 becomes an additional supporting surface when it bears on ledge 26.

The web 40 of the roof bow is bent at an angle from straight portions 52 and extends toward and beyond the common plane of end pieces 46. The web includes end pieces 56 which are part of the steel rods which form the legs 38 of the roof bow, and a main section 48 which is an arcuately shaped steel tube. The end pieces 56 may be secured to the main section 58 by welding or other suitable means. The main section 58, when the roof bow 22 is mounted, lies transversely across the top of the trailer to support the tarpaulin 18.

The web 40 may be selectively placed in a high or low position by inserting either end pieces 46 as shown in FIGS. 5, 6 and 7, or auxiliary legs 42 as shown in FIGS. 1–4, in the sockets 20, respectively.

A modified roof bow 22′ is shown in FIG. 9. This embodiment may be used where the top surface of sockets 20 are flush with ledge 26. In this construction, the legs 62 are straight steel rods which are parallel and are in a common plane, the web is composed of end pieces 64 which are part of the steel rods which forms legs 62 and are welded at opposite ends to the arcuately formed steel tube 66 which comprises the main section of the web, and auxiliary legs or rods 68 are forged to the legs 62 adjacent to the ends and perpendicular to the plane thereof. The web extends at an angle from the common plane of legs 62 and end pieces 64 in a direction opposite that of the auxiliary legs 68. The auxiliary legs 68 are so secured to the legs 62 that the latter rest directly on the ledge 24 of the top rail 16 when the auxiliary legs are inserted in the sockets 20 for the low position, it being understood that the upper end of the sockets will be flush with the ledge 24 and no collar will be used to attach the auxiliary legs 68 to the main legs 62.

While preferred embodiments of the invention have here been shown and described, a skilled artisan may make minor variations without departing from the spirit of the invention and the scope of the appended claims.

I claim:

1. In a trailer body having transversely spaced side walls, removable roof bows to connect said side walls at their upper ends and adapted to support a cover, each roof bow comprising a substantially U-shaped member having main legs including end portions lying in a common plane and a web connecting said main legs opposite said end portions and extending in a plane above said common plane, and auxiliary legs depending from said end portions of said main legs and spaced from the free ends thereof, said main and auxiliary legs being adapted for selective attachment to said side walls to provide two height positions of said roof bows.

2. The combination of claim 1 wherein said auxiliary legs lie in a plane substantially perpendicular to said common plane.

3. The combination of claim 1 wherein said main legs between said end portions and said web include portions indented downwardly with respect to said common plane, said indented portions being adapted to bear upon the upper ends of said side walls when said auxiliary legs are attached to said side walls.

4. In a trailer body having transversely spaced side walls and rails secured longitudinally thereon including vertically extending, longitudinally spaced sockets, roof bows each comprising a substantially U-shaped member having main legs including end portions in a common plane and a web connecting said main legs opposite said end portions and extending in a plane above said common plane, and auxiliary legs depending from said main legs and spaced from the free ends thereof, said main and auxiliary legs being adapted to be selectively engaged in said sockets to provide two height positions of said roof bows.

5. The combination of claim 4 and removable means to prevent withdrawal of said main and auxiliary legs from said sockets.

6. The combination of claim 5 wherein said auxiliary legs lie in a plane substantially perpendicular to said common plane.

7. The combination of claim 4 wherein said auxiliary legs are secured to said main legs by collars, said collars being adapted to bear on the upper ends of said sockets when said main legs are inserted in said sockets.

8. The combination of claim 4 wherein said rails include longitudinal ledges and said sockets extend above said ledges, said main legs between said end portions and said web including portions indented downwardly with respect to said common plane and adapted to bear on said ledges when said main legs are inserted in said sockets.

9. The combination of claim 8 wherein said auxiliary legs are secured to said main legs by collars, said collars being adapted to bear on the upper ends of said sockets when said main legs are inserted in said sockets.

References Cited by the Examiner

UNITED STATES PATENTS 3,155,419  11/1964  Garson et al. _____ 296—10 X

FOREIGN PATENTS 589,404  5/1925  France.

BENJAMIN HERSH, *Primary Examiner.*